J. Cochrane,
Mariners Sound Indicator.
No. 110,827. Patented Jan. 10, 1871.

Witnesses:
Jones Cochrane,
Daniel Burns.

Inventor:
James Cochrane

UNITED STATES PATENT OFFICE.

JAMES COCHRANE, OF NEW YORK, N. Y.

IMPROVEMENT IN MARINERS' SOUND-INDICATORS.

Specification forming part of Letters Patent No. 110,827, dated January 10, 1871.

*To all whom it may concern:*

Be it known that I, JAMES COCHRANE, of the city, county, and State of New York, have invented certain devices to enable a mariner to determine the direction of sound when from any cause he is prevented from exercising the sense of sight, of which the following is a specification.

I propose to designate my invention by the title "Mariner's Sound-Indicator."

Great inconvenience and many accidents fatal to life and destructive to property have resulted from the difficulty of determining direction of sound in navigation. For instance, when approaching or navigating harbors or rivers in which many vessels are moving in different directions enveloped in a thick fog, sound is resorted to as a means of signaling to prevent collisions, and with the ferry-boats to make out also their landings. Under such circumstances every mariner is aware of the extreme difficulty and inconvenience at present experienced in determining from what locality the sound originates. It would be impossible for me (fifty years a mariner) to cite the numerous instances where difficulties of this kind have rendered the position hazardous and frightful in the extreme. Now, my invention proposes to obviate measurably these difficulties by enabling the pilot (or other person whose duty it may be) to determine, if possible, without leaving his station, from what locality the sound originates. I accomplish this by means of tubes, one stationary with an opening convenient to the pilot's ear, and another tube forming a continuation of the first, movable to all the points of the compass by means of a wheel or lever under the mariner's immediate touch and control.

The person desiring to ascertain the point from which the sound proceeds is to turn the tube (a wheel or lever) until the most acute sound is heard through an opening in the fixed tube; and now, by observing any indicator, (as a king-spoke in the wheel,) which, being previously adjusted, shows the direction to which the opening of the movable tube points, he is thus enabled to determine the direction from which the sound proceeds—if necessary, by the sense of feeling.

Figure 1:
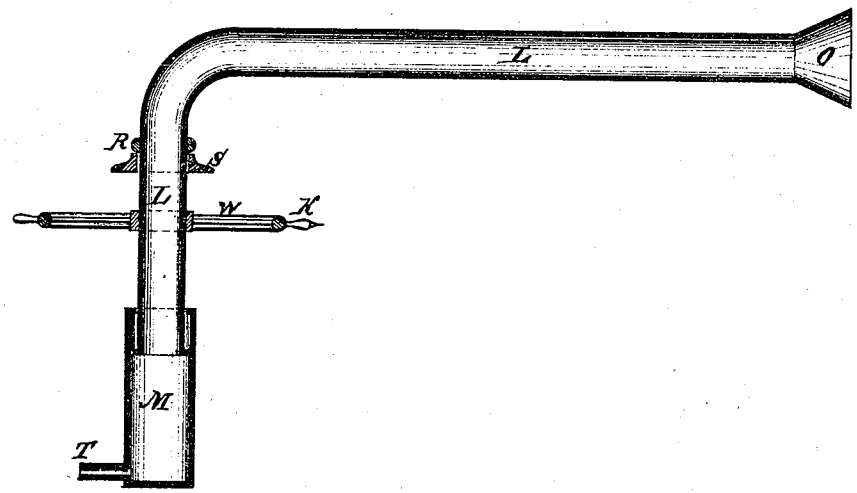
Figure 2:
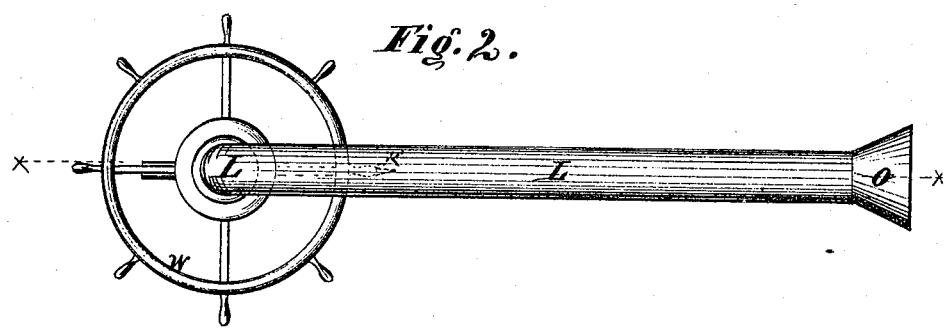

In the accompanying drawings, making part of this specification, Figure 1 is a line elevation of a contrivance embodying my invention. Fig. 2 is a plan of the same.

Like letters indicate like parts in all the figures.

In the figures, L is in this case an angular listening-tube. S is a rest and guide surrounding the listening-tube L, and carrying the weight of it, so as to permit its rotation or vibration. W is a lever-wheel fastened to the vertical and horizontal tube L. M is a telescopic adjustable termination of L, with an opening, T, for the ear of the pilot or mariner, and so constructed as to allow the tube L to vibrate or revolve while the opening T for the ear remains stationary.

Where it would be convenient, a flexible tube may be adjusted with one end attached to the opening T and the other to the mariner's ear to convey the sound.

The manner of operating is to turn the wheel or lever W, revolving or vibrating the tube L, until the most acute sound is heard through the opening T, or through the flexible tube, then, observing the direction indicated by the king-spoke K, or other contrivance indicating the direction to which the revolving opening O points, determines that to be the direction from which the sound proceeds.

The material used for the tubes may be that which conveys the sound easiest and best.

I have given the above description as representing the invention under a particular construction and arrangement; but I do not wish to be considered as limiting myself to a articular construction or arrangement.

I desire to secure by Letters Patent, and claim—

1. The combination of the stationary tube M, with opening T, and rotary or vibratory tube L, with opening O, substantially as and for the purposes hereinbefore set forth.

2. The combination of the tube L, with opening O, and M, with opening T, and wheel or lever and king-spoke K, substantially as and for the purposes hereinbefore set forth.

JAMES COCHRANE.

Witnesses:
JONES COCHRANE,
DANIEL BURNS.